United States Patent

[11] 3,596,669

| [72] | Inventor | Julius Alberani |
| | | 4785 Curtis, Dearborn, Mich. 48126 |
| [21] | Appl. No. | 840,768 |
| [22] | Filed | July 10, 1969 |
| [45] | Patented | Aug. 3, 1971 |

[54] PRESSURE RATIO DEVICE
5 Claims, 3 Drawing Figs.

[52] U.S. Cl. .................................................. 137/81,
251/28, 251/58, 137/625.66, 415/27, 92/36, 92/49
[51] Int. Cl. .................................................. F16k 31/145
[50] Field of Search .......................................... 251/28;
137/86, 108, 84, 81; 415/28, 27; 92/36, 49

[56] References Cited
UNITED STATES PATENTS

| 2,517,051 | 8/1950 | Swenson | 137/84 |
| 2,712,321 | 7/1955 | Grogan | 137/86 |
| 2,781,770 | 2/1957 | Sutton | 137/86 X |
| 3,219,309 | 11/1965 | Alberani | 251/28 |

*Primary Examiner*—M. Cary Nelson
*Assistant Examiner*—R. B. Rothman
*Attorney*—Walter Potoroka, Sr.

ABSTRACT: A pressure ratio device having a first pressure-responsive diaphragm exposed at opposite sides to two different control pressures is operatively connected as by cooperating links and levers to a valve member which when actuated to one position produces a first output pressure signal and when actuated to a second position produces a second output pressure signal; a second reset type of pressure-responsive diaphragm is operatively connected to the first diaphragm and at times exposed at opposite sides thereof to the same two different control pressures and at other times exposed at opposite sides thereof to only one of the control pressures; the second reset diaphragm thereby functioning to develop a controlled hysteresis within the overall system thereby requiring a greater force to be exerted on the first diaphragm to move the valve member to the first position as compared to the force exerted on the first diaphragm required to move the valve member to its second position.

PATENTED AUG 3 1971
3,596,669
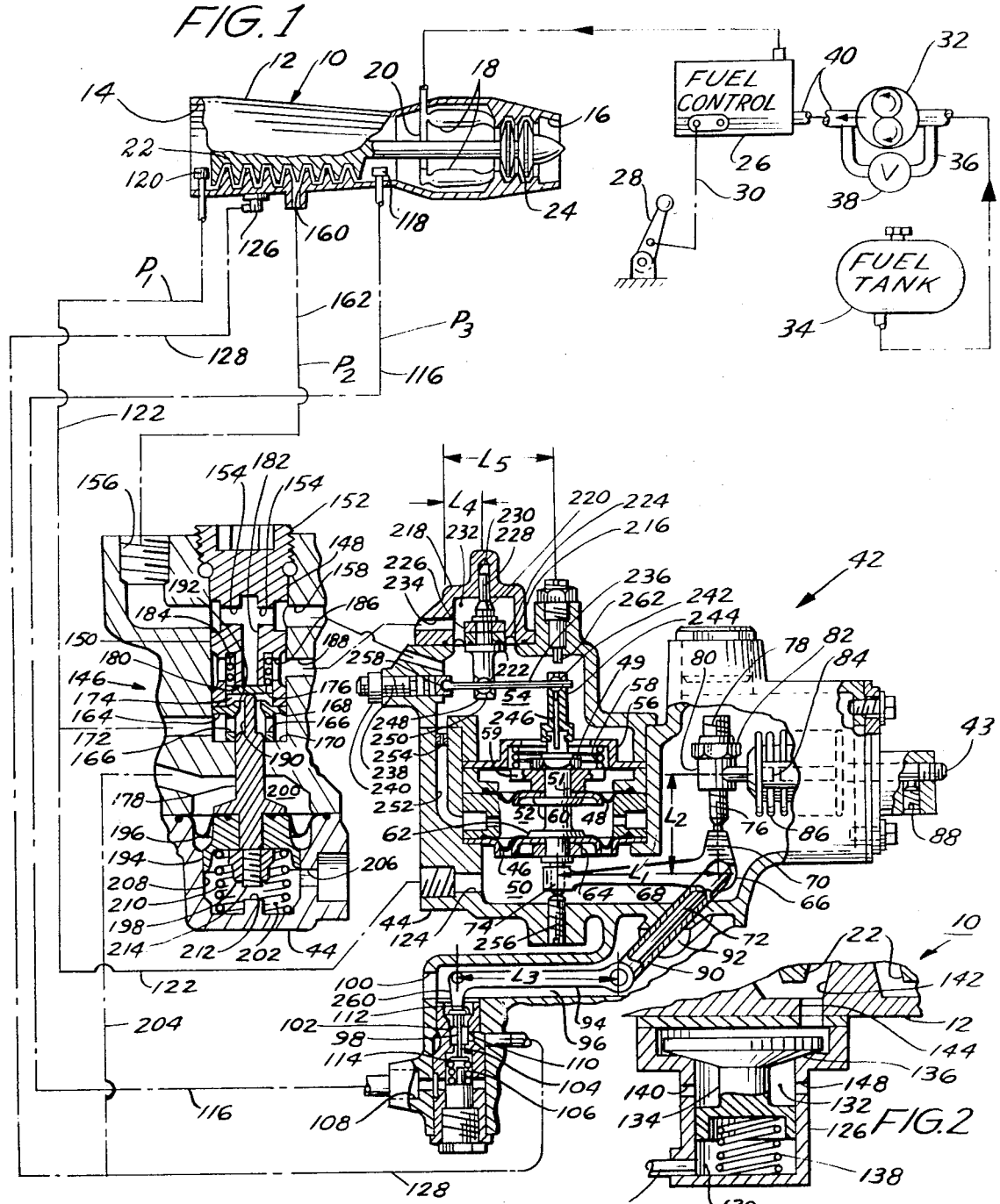
FIG. 1
FIG. 2
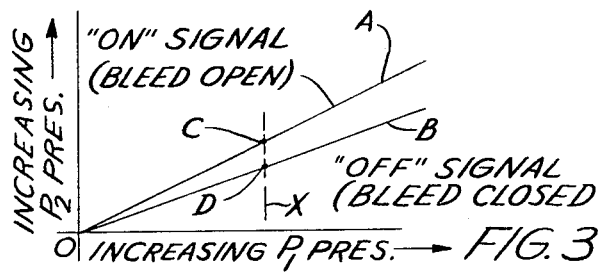
FIG. 3
JULIUS ALBERANI
INVENTOR.

PRESSURE RATIO DEVICE

BACKGROUND OF THE INVENTION

Turbine engines, regardless of whether they employ a single solid compressor or a split compressor always encounter the problem of compressor stall. The efficiency of the overall engine is dependent, primarily, on the rate at which air is supplied by the compressor. However, during certain periods of engine operation, some stages of the compressor will supply greater quantities of air than subsequent stages of the compressor can accommodate. As a consequence thereof, choking or stalling of certain compressor stages occurs which, in turn, results in surging airflow and fluctuations in compressor discharge pressure thereby creating dangerous engine vibrations. This problem is often overcome by the provision of a compressor bleed assembly which serves to bleed the pressure of certain stages of the compressor.

In the past it has been proposed to provide pressure ratio sensing devices responsive to the attainment of a particular numerical value of a pressure ratio as, for example, $P_2/P_1$ where $P_1$ is the compressor inlet pressure and $P_2$ is the pressure at some intermediate stage of the compressor. Such devices would function to open or close the compressor bleed assembly when that particular numerical value of the ratio of $P_2/P_1$ was attained.

However, such prior art devices do have some problem of instability in that the control signal for both opening and closing the bleed assembly is substantially the same numerical value of $P_2/P_1$.

Accordingly, the invention herein disclosed is directly concerned with the solution of the above as well as other attendant and related problems.

SUMMARY OF THE INVENTION

According to the invention, a pressure ratio device comprises a housing, first pressure-responsive means having first and second operating positions, said first pressure-responsive means being situated in said housing and exposed to first and second fluid control pressures for creating an actuating pressure differential thereacross, second pressure-responsive means operatively connected to said first pressure-responsive means and exposed to one of said control pressures, means for producing an output signal operatively connected to said first pressure-responsive means and effective for producing a first output signal when said first pressure-responsive means is moved to said first operating position and effective for producing a second output signal when said first pressure-responsive means is moved to said second operating position, said second pressure-responsive means being effective to move said first pressure-responsive means to said first operating position when said actuating pressure differential attains a first predetermined magnitude, and third pressure-responsive reset means operatively connected to said first pressure-responsive means, said pressure-responsive reset means being exposed to at least one of said fluid control pressures and effective for producing a controlled hysteresis with respect to said first pressure-responsive means so as to thereby require said actuating pressure differential to be of a second predetermined magnitude before said first pressure-responsive means will move to said second operating position.

Accordingly, a general object of this invention is to provide a pressure ratio device which will, in response to an input of two distinct fluid pressures, produce employable first and second output signals in accordance with the corresponding attainment of first and second magnitudes of pressure differentials of said first and second distinct fluid pressures.

Other more specific objects and advantages of the invention will become apparent when reference is made to the following detailed description considered in conjunction with the accompanying drawings.

DESCRIPTION OF THE DRAWINGS

In the drawings, wherein certain details may be omitted for purposes of clarity:

FIG. 1 is a schematic view, with portions thereof cut away and in cross section, illustrating the adaptation of the invention to a gas turbine engine;

FIG. 2 is an enlarged fragmentary cross-sectional view of a portion of FIG. 1; and FIG. 3 is a graph illustrating the operating characteristics of the invention.

DESCRIPTION OF PREFERRED EMBODIMENT

Referring now in greater detail to the drawings, FIG. 1 illustrates a turbine engine 10 having an outer housing 12 with an air intake 14 and an exhaust nozzle 16. A combustion chamber 18, supplied by a fuel distribution ring 20, is located between the compressor 22 and the turbine 24.

The fuel distribution ring 20 receives metered fuel from a fuel control unit 26 which responds to an input request signal created by a pilot control lever 28 and transmitted by linkage 30, along with other appropriate input signals created by other means responsive to additional operating conditions such as temperature, speed, altitude and compressor pressure. These various other input signal means do not form a part of the invention and are well known in the art; accordingly, they are not illustrated.

A gear pump 32 adapted to receive fuel from the fuel tank 34 may, of course, be provided in order to supply unmetered fuel to the control 26. A bypass conduit 36 having a relief valve 38 connected serially therewith may also be provided in order to maintain a relatively constant fuel pressure in conduit 40.

The pressure ratio device, illustrated generally at 42, is comprised of a housing or body 44 containing diaphragms 46 and 48 secured therein so as to provide three distinct chambers 50, 52 and 54. Bracket 56 in chamber 54 serves as an abutment for one end of a spring 58 which has its other end against a flange member 59 secured against the diaphragm 48 as by a nut 49 threadably engaged with centrally disposed rod member 51. As shown, the rod 51 may be provided with integrally formed flanges 60 and 62 so as to abuttably engage and secure the respective diaphragm assemblies thereagainst by the cooperative action of nuts 49 and 64 threadably engaged with the rod 51.

A lever 66, comprised of arms 68 and 70 which are shown to be substantially perpendicular to each other, is fixedly secured to one end of a shaft 72 for rotation therewith. Arm 68 is threadably engaged with a lower extension 74 of the rod or stem 51 while arm 70 includes a threaded extension 76 threadably engaged internally of an internally and externally threaded cylindrical cap 78 which, in turn, is retained within a collar extension 80 as by a locking nut 82.

The collar extension 80 is formed or carried at one end of a bellows shaft, broken as at 84, of an evacuated bellows assembly 86 secured by threads 43 to the housing 44 and locked in place by a setscrew 88. The bellows shaft is broken at 84 to facilitate the adjustment of the bellows spring load by permitting movement of one end of the bellows 86 while the other end remains fixed.

A rigidly fixed tube 90 press fitted into a boss 92 of body 44 acts both as a bearing for shaft 72 and as a spacer preventing the lever 66 from moving laterally. Shaft 72 is similarly fixedly secured at its opposite end to a second lever 94 located in a chamber 96 so as to transmit movement of lever 66 via lever 94 to a servo valve 98. Lever 94, like lever 66, is also prevented from moving laterally by the rigidly mounted spacer tube 90. Chamber 96 is continually vented to the atmosphere via port 100 for a purpose which will be described later.

Servo valve 98 closes either upon a seat 102 or upon a seat 104, depending upon the direction of movement of lever 94. When lever 94 is lifted away from the servo valve 98, spring 106 and pressure $P_3$ will move the valve 98 against seat 104, thereby preventing communication between inlet 108 and outlet 110 and providing communication between chamber 96 and outlet 110 through the clearance indicated generally at 112. When lever 94 is moved against valve 98, spring 106 is compressed to reverse the above condition; that is, communication between chamber 96 and outlet 110 is prevented while communication between inlet 108 and outlet 110 is completed through the clearance generally indicated at 114. The purpose of the above operation of valve 98 will become evident as the description progresses.

One end of a conduit 116 is in continual communication with inlet 108 while the other end thereof is continually exposed to compressor discharge pressure, or burner inlet pressure, $P_3$, as by means of a suitable pressure probe 118. A second pressure probe 120, located upstream of the compressor 22, continually senses and communicates compressor inlet pressure, $P_1$, to chamber 50 by means of conduit 122 and an inlet 124.

A housing 126, which may be either an integral part of the general housing 12 or separately attached thereto, is in continual communication with outlet 110 by means of a conduit 128. Housing 126, which is better illustrated in FIG. 2, is comprised of a body 130 formed to provide a chamber 132 containing a valve 134, valve seat 136 and a spring 138. Chamber 132, on one side of valve 134, communicates with the atmosphere via ports 140 and, on the other side of valve 134, communicates with a selected stage 142 of the compressor 22 by means of port or passageway 144.

As also shown in FIG. 1, housing or body portion 44 may also include a valving arrangement 146 which includes a pluglike member 148 received within a cylindrical chamber 150, formed in the body portion 44, and retained therein as by coacting threaded portions shown at 152. The plug or valve guide member 148 has formed therethrough radially directed passages or conduit portions 154 which serve to complete communication between conduit portions 156 and 158 formed in housing or body 44. As can be seen, conduit portion 158 communicates with chamber 54 while conduit portion 156 communicates with a selected stage 160 of the compressor 22, via conduit 162, so as to thereby communicate an intermediate pressure, $P_2$, to chamber 54.

A first, insert type, valve seat 164 situated in the lower end of cylindrical chamber 150 and provided with radially directed ports 166 is held in position by the end 168 of valve guide member 148. As can be seen, an axially extending wall portion of valve seat 164, through which ports 166 are formed, combines with chamber 150 to define an annular chamber 170 which is in continuous communication with a branch conduit 172 communicating at its other end with conduit 122.

Valve guide 148, radially inwardly at its end 168, has a cylindrical passageway or chamber 174 formed therein as to slidably receive a valving member 176. Valve member 176, when moved upwardly by the plungerlike member 178 abuts against a valve seat portion 180 so as to thereby close the otherwise open end of an axially directed conduit 182 communicating at its upper end with conduit portions 154. A coiled compression spring 184, situated within an annular recess or cavity formed generally about the valve seat portion 180, serves to move the valve member 176 downwardly to open the lower end of conduit 182 whenever plunger or actuator 178 is caused to move downwardly. As illustrated, valve guide member 148 is also provided with radially directed apertures or passages 186 which, through a suitable cooperating annulus, communicate with one end of a conduit 188. It should also be made clear that valve 176 is provided with peripherally located relief portions which enable the free communication between annulus 170 and ports 186 when the valve 176 is seated against seat 180 as shown.

Plunger or actuator 178, slidably received in the housing portion 44 and provided with a fingerlike extension 190 at one end which is of a cross-sectional dimension enabling it to freely pass through the centrally disposed orifice 192 of valve seat 164, is secured at its other end to a pistonlike member 194, in a manner as to retain the inner portion of a pressure-responsive diaphragm 196 therebetween, as by means of a nut 198. Diaphragm 196 serves to define, at opposite sides thereof, two generally variable but distinct chambers 200 and 202. Chamber 200 is in continuous communication with conduit 128 via a branch conduit 204 while chamber 202 is vented to the atmosphere by means of a port or passageway 206. Chamber 202, which may have a cylindrical wall 208 for slidably receiving therein piston 194, also contains a compression spring 210 urging piston 194 and actuator 178 upwardly as well as a stop or abutment portion 212 intended for at times abuttably engaging the lowermost end 214 of actuator 178 in order to limit the downward movement of actuator 178 and piston 194.

As can be seen at the upper portion of housing 44, an additional pressure-responsive diaphragm 216, peripherally secured between housing 44 and a cooperating caplike member 218, is secured at its radially inner portion to an axially movable stem member 220. The diaphragm 216 may, as shown, be secured between a lower flange 222 formed integrally on stem 220 and an upper disposed spacer 224 secured in place by a nut 226 threadably engaged with stem 220. An upper extension 228 formed on stem 220 is slidably received within a cooperating guideway 230 formed in cap 218 so as to maintain the axial alignment of stem 220 while it experiences axial motion. As can be seen, chamber 232, defined generally by the interior of cap 218 and the upper surface of diaphragm 216 is in continual communication with conduit 188 via conduit 234.

A lever 236 having one end pivotally secured to a body member 238, threadably secured in body 44 and held therein as by a lock nut 240, has its other end connected, as by a suitable ball pivot connection 242, to an end extending connector 244 secured to the upper end of stem 51. A locating pin 246 received in both stem 51 and connector extension 244 serves to maintain axial alignment therebetween. A lower extension 248 of stem 220 is operatively connected to lever 236 at a point between its ends through a ball pivot member 250, similar to that of 242. Further, as also clearly illustrated, a degree of communication between chambers 52 and 54 is achieved as by conduit means 252 including calibrated restriction means 254 situated therein.

OPERATION

Turbine engines, regardless of whether they employ a single solid compressor, as illustrated, or a split compressor, sometimes encounter the problem of compressor stall. The efficiency of the overall engine is dependent, primarily, on the rate at which air is supplied by the compressor. However, during certain periods of engine operation, some stages of the compressor will supply greater quantities of air than subsequent stages of the compressor can accommodate. As a consequence, choking or stalling of certain compressor stages occurs, which results in surging airflow and fluctuations in compressor discharge pressure, thereby setting up dangerous engine vibrations. This problem is overcome, as previously indicated, by the provision of a compressor bleed assembly which serves to bleed certain stages of the compressor.

In describing the operation of the pressure ratio device disclosed herein, which is provided for controlling such a compressor bleed actuator, it may be best to first define the respective relationships of the pressures involved. In the embodiment disclosed, compressor inlet pressure $P_1$ is the lowest pressure. Compressor discharge pressure, $P_3$, is the highest pressure involved, with pressure, $P_2$, being some intermediate pressure between $P_1$ and $P_3$. Ambient atmospheric pressure, $P_a$, would, at any given time, be something slightly less than $P_1$.

The invention contemplates that bleeding some selected stage of the compressor can be regulated in response to a selected ratio (or ratios) of $P_2/P_1$, and the force balance equation for the system disclosed can be seen to be:

where: $P_1$ = compressor inlet pressure;
$P_2$ = some intermediate stage compressor pressure;
$P_3$ = compressor discharge pressure;
$A_1$ = effective area of either diaphragm 46 or 48; $A_2$ = effective area of diaphragm 216;
$A_B$ = effective area of bellows 86;
$A_P$ = effective area of end portions of valve 98;
$L_1$ = length of lever arm 68;
$L_2$ = length of lever arm 70 and extension 76;
$L_3$ = length of lever arm 94;
$L_4$ = length of lever arm from fixed pivoted end of lever 236 to centerline of stem 220;
$L_5$ = length of lever arm from same fixed pivoted end of lever 236 to centerline of extension 244.

(a)
$$(P_2-P_1)(A_1)(L_1)-(P_2-P_R)\left(\frac{A_2 L_4 L_1}{L_5}\right)$$
$$=(P_1)(A_B)(L_2)+(P_3-P_{NAC})(A_P)(L_3)$$

In above equation (a), pressure $P_R$ is the resultant pressure within chamber 232 and as will become obvious can be of a value of either $P_1$ or $P_2$. Further, $P_{NAC}$ is the engine nacelle pressure. Accordingly, if it is assumed that $P_{NAC}$ is equal to $P_1$, then:

(b)
$$\left[\left(\frac{P_2}{P_1}-1\right)(A_1)-\left(\frac{P_2-P_R}{P_1}\right)(A_2)\left(\frac{L_4}{L_5}\right)\right]L_1$$
$$=A_B L_2+\left(\frac{P_3}{P_1}-1\right)A_P L_3$$

An inspection of the above equation (b) discloses that the various areas and lever arms in fact constitute mathematical constants and therefore equation (b) can be rewritten in the following form where:

$K_1 = A_1$
$K_2 = (A_2)\left(\frac{L_4}{L_5}\right)$
$K_3 = L_1$
$K_4 = (A_B)(L_2)$
$K_5 = (A_P)(L_3)$ (c)
$$\left[\left(\frac{P_2}{P_1}-1\right)K_1-\left(\frac{P_2-P_R}{P_1}\right)K_2\right]K_3=K_4+\left(\frac{P_3}{P_1}-1\right)K_5$$

Further, as was previously stated, $P_R$, is a resultant pressure and may have a value of either $P_1$ or $P_2$. Accordingly, assuming that $P_R=P_1$ and making such substitution in above equation (c) the following is obtained (d)
$$\left[\left(\frac{P_2}{P_1}-1\right)K_1-\left(\frac{P_2}{P_1}-\frac{P_1}{P_1}\right)K_2\right]K_3=K_4+\left(\frac{P_3}{P_1}-1\right)K_5$$
or:
(e)
$$\left[\left(\frac{P_2}{P_1}-1\right)K_1-\left(\frac{P_2}{P_1}-1\right)K_2\right]K_3=K_4+\left(\frac{P_3}{P_1}-1\right)K_5$$

factoring:
(f) $$\left(\frac{P_2}{P_1}-1\right)(K_1-K_2)K_3=K_4+\left(\frac{P_3}{P_1}-1\right)K_5$$

of course, $(K_1-K_2)K_3$ can be replaced by $K_6$ to thereby obtain the following:

(g) $$\left(\frac{P_2}{P_1}-1\right)K_6=K_4+\left(\frac{P_3}{P_1}-1\right)K_5$$

However, assuming now that $P_R=P_2$ and making the substitution in equation (c) the following is obtained:

(h)
$$\left[\left(\frac{P_2}{P_1}-1\right)K_1-\left(\frac{P_2}{P_1}-\frac{P_2}{P_1}\right)K_2\right]K_3=K_4+\left(\frac{P_3}{P_1}-1\right)K_5$$
or:
(i) $$\left[\left(\frac{P_2}{P_1}-1\right)K_1\right]K_3=K_4+\left(\frac{P_3}{P_1}-1\right)K_5$$

Again, $(K_1)(K_3)$ can be replaced by a constant $K_7$ to thereby obtain the following:

(j) $$\left(\frac{P_2}{P_1}-1\right)K_7=K_4+\left(\frac{P_3}{P_1}-1\right)K_5$$

In comparing equations (g) and (j) it can be seen that two different quantities, namely the left-hand portions of the respective equations are not equal to each other but are equal to the same third quantity which is the right-hand portion of the respective equations. This in effect mathematically demonstrates the force balance equations under two different operating conditions each of which is determined by the value of pressure, $P_R$, within chamber 232. That is, by selectively controlling the admission of either $P_1$ or $P_2$ into chamber 232 one or the other of the force balance equations will be correspondingly satisfied.

The following describes the operation of the invention as disclosed by the structure of FIGS. 1 and 2. During engine shutdown pressures $P_1$, $P_2$ and $P_3$ cease to exist as such and can be considered to be at a value equivalent to, $P_a$, or ambient atmospheric. Consequently, spring 210 in chamber 202 holds the plunger actuator 178 in its illustrated uppermost position thereby maintaining valve member 176 seated closed against seat portion 180. Likewise, the pressure force of $P_a$ acting on the evacuated bellows 86 causes lever 64 to be in its extreme clockwise direction with the extension 244 of stem 51 against adjustable stop member 262. Because of such action, upper level 236 is rotated counterclockwise about its end pivot 258 to a first maximum position. Similarly, levers 66 and 94, each secured to shaft 72 for rotation therewith, have been rotated clockwise about shaft 72 causing end 260 of lever 94 to break contact with valve 112. Spring 106 causes valve member 98 to terminate communication, through seat 114, chamber 108 to outlet 110. However, as shown, this causes the upper end of valve 98 to move away from seat 112, thereby completing communication between chamber 96 and outlet 110.

Of course, the overall operating principle of the invention is that bleeding of the stage 142 of the compressor is accomplished by opening the valve 134 under certain conditions of engine operation so that air (excess pressure) can escape into the atmosphere through ports 140. The pressure at the stage 142 to be bled is somewhere between $P_1$ and $P_3$ pressure. This intermediate pressure acting on the area of the valve 134 is sufficient to maintain valve 134 closed on the seat 136 against the force of spring 138, unless the high pressure, $P_3$, which is the actuating pressure for the valve 134, is supplied to the chamber 139 through the conduit 128.

Assuming now that the engine is operating at conditions which produce a pressure ratio of $P_2/P_1$ below an actuating or controlling ratio, it can be seen that pressure $P_1$ is directed, through probe 120 and conduit 122, to chamber 50 so as to be applied to the underside of diaphragm assembly 46 and is simultaneously directed, through branch conduit 172 to the annular chamber 170 and through ports 166 so as to be applied generally to the underside of valve member 176.

At the same time, pressure $P_2$, supplied by compressor station 160, is directed via conduits 162, 156, conduit portions 154 and conduit 158 to chamber 54 where it is applied against the upper side of diaphragm assembly 48 as well as to the underside of diaphragm assembly 216. Further, as also illustrated, pressure $P_2$ is also supplied to chamber 52 by means of conduit 252 communicating between chambers 52 and 54. Accordingly, it can be seen that at this time there is a pressure differential of $P_2-P_1$ across collective diaphragms 48 and 46;

this can also be looked at as being a pressure differential of $P_2-P_1$ across only diaphragm 46 because the opposite sides of diaphragm 48 are exposed to the same pressure, $P_2$. The force created by the pressure differential $P_2-P_1$ tends to move stem 51 downwardly against stop 256 but is prevented from so doing by the action of evacuated bellows 86 which, because of its effective pressure area, causes lever 66 to rotate clockwise to the degree resulting in extension 244 of stem 51 abutting against the upper adjustable stop member 262.

During this condition of engine operation pressure $P_1$, supplied to annular chamber 170, is communicated through ports 166, orifice 192 of seat 164, through the clearance between the outer edge of valve 176 and the wall 174, through ports 186, and through conduits 188 and 234 and into chamber 232. Consequently, diaphragm 216 experiences an upwardly directed force resulting from the upward pressure differential of $P_2-P_1$ thereacross.

Since bellows 86 has rotated lever 66 clockwise to its first maximum position, lever 94 has been correspondingly rotated causing end 260 to move upwardly or away from the upper end of valve 98. This then permits spring 106 to move valve 98 upwardly causing the lower end of valve 98 to close against its valve seat 104 thereby preventing any communication between inlet 108 and outlet 110. Such movement of valve 98, however, opens the upper valve seat 102 thereby completing communication between orifice 100 (in chamber 96) and outlet 110. Orifice 100 may, in fact, be at atmospheric pressure or, as is contemplated herein in the preferred embodiment, at engine nacelle pressure, $P_{NAC}$. If then $P_{NAC}$ is considered to be equal to pressure $P_1$, it can be seen hat such pressure $P_1$ is communicated by conduit 128 from outlet 110 to chamber 139 (FIG. 2). Since pressure $P_1$ is substantially less than pressure $P_3$(or even $P_1$) the pressure at stage 142 of the compressor 22 is sufficient to maintain valve 134 closed against its seat 136. Further, chamber 200 is also at pressure $P_1$ ($P_{NAC}$) by virtue of branch conduit 204 while chamber 202 is continually vented, by means of conduit 206 to a source of $P_{NAC}$ pressure also. Therefore, since no pressure differential exists across piston member 194, spring 210 is permitted to maintain the plunger actuator 178 in its upper position.

When the engine approaches a compressor stall or choke condition, the value of pressure $P_2$ increases. Disregarding, for the moment, the existence of lever 236 and associated diaphragm 216, it can be seen that as the value of pressure $P_2$ increases in chambers 52 and 54, a greater pressure differential of $P_2-P_1$ is created across diaphragm 46 tending to move stem 51 downwardly. When the value of $P_2$ increased sufficiently (taking into account, of course, the various effective pressure areas and lever arms involved) the resulting downward force would be sufficient to overcome bellows 86 and thereby move stem 51 downwardly against stop 256 and rotate lever 66 accordingly. However, this does not happen because of the existence of diaphragm 216 and associated lever 236. That is, since diaphragm 216 is also exposed to the same increasing pressure differential $P_2-P_1$, but in the opposite direction, the resulting downward force on stem 51 is equal to the area of diaphragm 46 multiplied by the pressure differential thereacross, less the area of diaphragm 216 multiplied by the pressure differential thereacross and further multiplied by the effective lever arm of lever 236.

Accordingly, it can be seen that diaphragm 216 and associated lever 236 serve to reduce the effective area of primary diaphragm 46 during the time that ratio of $P_2/P_1$ increases.

Nevertheless, eventually pressure $P_2$ increases sufficiently to cause the ratio diaphragms 48 and 46 to overcome the opposed forces and move stem 51 downwardly into contact with stop 256. The attendant counterclockwise rotation of levers 66 and 94 results in end 260 of lever 94 pushing valve 98 downwardly, against spring 106, closing communication between chamber 96 (and orifice 100) and outlet 110 while opening valve seat 104 to thereby complete communication between inlet 108 and outlet 110.

As a consequence of inlet 108 and outlet 110 being placed in communication with each other, relatively high pressure $P_3$, communicated by conduit 116 and probe 118, is directed through inlet 108 and outlet 110, through conduit 128 and into chamber 139. The admission of $P_3$ pressure to chamber 139 causes valve 134 to move upwardly away from its seat 136 to thereby bleed some of the pressure, from stage 142 of compressor 22, through passageway 144 to the atmosphere through ports 140.

As can also be seen, when pressure $P_3$ is thusly admitted to conduit 128, it is also directed via branch conduit 204 to chamber 200 and the pressure differential across piston 194 created thereby causes piston 194 and actuator plunger 178 to move downwardly against spring 210 until end 214 abuts against stop member 212. Such downward movement of plunger 178 enables upper compression spring 184 to move the valve element 176 downwardly into engagement with seat 164 in order to thereby terminate communication through orifice 192 and complete communication between conduit 182 and ports 186.

Accordingly, it can be seen that as a consequence of conduit 12 being placed in communication with ports 186, pressure $P_2$ is directed from conduit 156 via conduits 18 and 234 to chamber 232 above diaphragm 216. Consequently, the pressure differential of $P_2-P_1$ which previously existed across diaphragm 216 now ceases to exist because both sides of diaphragm 216 are exposed to the same pressure $P_2$.

As the engine starts to pass through its compressor stall or choke condition, he ratio of pressures $P_2/P_1$ begins to decrease primarily because of the reduction in the value of pressure $P_2$. However, as the ratio of $P_2/P_1$ is decreasing pressure $P_3$ is still being admitted to chamber 200 keeping the actuator 178 in its downmost position.

When pressure $P_2$ has sufficiently, decreased the downward force created by the pressure differential of $P_2-P_1$ across diaphragms 48 and 46 is overcome by the force of evacuated bellows 86. At this point bellows 86 rotates levers 66 and 94 clockwise causing stem 51 to move upwardly until the upper extension 244 abuts against upper stop 262. Simultaneously, of course, and 260 of lever 94 has been lifted away from upper end of valve 98 permitting spring 106 to move valve 98 upwardly thereby terminating communication between inlet 108 and outlet 110 and restoring communication between passageway 100, chamber 96 and outlet 110. This, in effect, terminates the application of $P_3$ pressure to chamber 139 and restores the low $P_1$ pressure to chamber 139 as well as chamber 200.

In view of the above, it should be noted that the force required to move stem 51 upwardly was less than the force required to move the stem 51 downwardly because of the valving arrangement 146 and cooperating diaphragm assembly 216. That is, when the pressure ratio $P_2/P_1$ tries to move the stem 51 downwardly the same ratio of $P_2/P_1$ is applied to diaphragm 216 which tends to maintain the stem 51 in its uppermost position thereby requiring the ratio of $P_2/P_1$ to increase sufficiently to overcome the resistance offered by diaphragm assembly 216. However, when stem 51 is in its down position, diaphragm 216, by virtue of valving arrangement 146, is effectively taken out of the system thereby enabling the stem 51 to move upwardly when the numerical value of $P_2/P_1$ is less than the numerical value of $P_2/P_1$ required to move stem 51 from its upper position to its down position.

Accordingly, in view of the above, it should be apparent that diaphragm 216 in effect constitutes a reset diaphragm while the pressure communicated through conduit means 128 constitutes a signal pressure. The relatively high $P_3$ pressure could be called an "ON" signal in the sense that the bleed valve 134 is "ON" and performing its bleed function in response thereto, while the relatively low pressure $P_{nac}$ or $P_1$, as the case may be, could be called an "OFF" signal in that its application to chamber 139 enables the bleed valve 134 to "OFF" of its bleed function.

FIG. 3 graphically illustrated the characteristic operation of the invention. That is, it can readily be seen that for any particular existing condition as represented, for example, by line, X, that a lower numerical ratio of $P_2/P_1$ is required, as represented by point D, before the "OFF" signal is created in order to close the bleed valve as compared to point C, which represents a numerically higher ratio of $P_2/P_1$ required before the "ON" signal is created to open the bleed valve.

In view of the preceding, it should be apparent that the relative positions of curves (straight line curves) A and B could be reversed from that shown in FIG. 3 depending, of course, on the direction in which the reset diaphragm 216 is made to be effective. This, of course, could be done in order to match the requirements of the particular engine involved.

The secondary or additional diaphragm 48 has been included within the system as a safety device. That is, a possibility always exists that diaphragm 46 may become ruptured. If this were to happen it could be seen that the pressure in chamber 54 would act upon he area of diaphragm 48 in the same manner in which the pressure in chamber 52 had acted upon the area of diaphragm 46. Downward movement of diaphragm 48 would move the stem 51 downwardly until it came into contact with stop 256 thereby causing lever 66 to move in the same manner as it had previously been influenced by diaphragm 46.

The invention has been disclosed in relation to the operation of a compressor bleed valve. It should, of course, be apparent that the invention is not limited to merely the operation of a bleed valve. For example, the resultant signal in conduit 128 can equally well be employed for the control and adjustment of selected variable positioned compressor stator vanes, which are well known in the art, in order to thereby correspondingly position such stator vanes in order to accommodate the compressor stall or choke conditions. It is equally probable that the invention could be employed for controlling both adjustable compressor stator vanes as well as compressor bleed valve arrangements in such engines which employ, in combination, such stator vanes and bleed valve.

It should also be pointed out that the invention has been disclosed in an environment where the engine compressor bleed valve is normally closed and is only opened at possibly higher engine speeds by the application of $P_3$ pressure to the bleed valve. However, it is evident that many turbine engines are matched at their lower speeds so that the bleed valve is normally open because there is an excess of air at such comparatively lower engine speeds. In such instances the conduitry involved would be so arranged as to apply the relatively high signal pressure $P_3$ to the bleed valve in order to close the bleeds. Such changes and alterations are believed to be well within the ability of one skilled in the art provided with the disclosure herein made.

Although only one preferred embodiment of the invention has been disclosed and described, it is apparent that other embodiments and modifications of the invention are possible within the scope and spirit of the invention.

I claim:

1. A pressure ratio device, comprising a housing, first pressure-responsive means having first and second operating positions, said first pressure-responsive means being situated in said housing and exposed to first and second fluid control pressures for creating an actuating pressure differential thereacross, second pressure-responsive means operatively connected to said first pressure-responsive means and exposed to one of said control pressures, means for producing an output signal operatively connected to said first pressure-responsive means and effective for producing a first output signal when said first pressure-responsive means is moved to said first operating position and effective for producing a second output signal when said first pressure-responsive means is moved to said second operating position, said second pressure-responsive means being effective to move said first pressure-responsive means to said first operating position when said actuating pressure differential attains a first predetermined magnitude, third pressure-responsive reset means operatively connected to said first pressure-responsive means, said pressure-responsive reset means being exposed to at least one of said fluid control pressures and effective for producing a controlled hysteresis with respect to said first pressure-responsive means so as to thereby require said actuating pressure differentiation to be of a second predetermined magnitude before said first pressure-responsive means will move to said second operating position, said first pressure-responsive means comprising a first diaphragm assembly, said second pressure-responsive means comprising an evacuated bellows assembly, said third pressure-responsive reset means comprising a second diaphragm assembly having an effective pressure area less than the effective pressure area of said first diaphragm assembly, and first lever means operatively interconnecting said bellow assembly and said first diaphragm assembly.

2. A pressure ratio device according to claim 1 wherein there is additionally provided second lever means operatively interconnecting said second diaphragm assembly and said first diaphragm assembly, wherein said means for producing an output signal comprises a valve assembly having a valve member positionable in either of at least two operating positions and including an outlet, said valve member when in a first of said two positions being effective to complete communication between a source of relatively low fluid pressure and said outlet to thereby produce said first output signal, said valve member also being effective when in a second of said two positions to complete communication between a source of relatively high fluid pressure and said outlet to thereby produce said second output signal, and including additional lever means operatively interconnecting said valve member and said first diaphragm assembly for enabling said first diaphragm assembly to move said valve member to said first and said operating positions.

3. A pressure ratio device according to claim 1, wherein said first diaphragm assembly is situated within said housing as to define first and second variable but distinct pressure chambers on opposite sides of first diaphragm assembly, said first chamber being adapted for communication thereto of said first control pressure and said second pressure chamber being adapted for communication thereto of said second control pressure, wherein said evacuated bellows assembly is situated within said first pressure chamber, said first lever means is situated within said first pressure chambers, wherein said third pressure-responsive reset means is situated within said housing as to have one side thereof continually expand to the pressure within said second pressure chamber while the other side thereof is continually exposed to the pressure within a third pressure chamber, including second lever means situated within said second chamber operatively interconnecting said first diaphragm assembly and said second diaphragm assembly, and valving means responsive to the presence of either said first or second output signals for in accordance therewith applying a pressure to said third chamber equivalent to said second control pressure or applying to said third chamber a pressure of a magnitude substantially less than the magnitude substantially less than the magnitude of said second control pressure.

4. A pressure ratio device according to claim 3 wherein said valving means comprises a valve member positionable in either of two operating positions, a first valve seat for determining a first of said two operating positions, a second valve seat for determining a second of said two operating positions, a valve outlet port, outlet conduit means communicating between said outlet port and said third pressure chamber, a first inlet communicating between a source of said first control pressure and said first valve seat, a second inlet communicating between a source of said second control pressure and said second valve seat, a pressure responsive actuator normally resiliently biased as to operatively engage and move said valve member against said second seat to thereby prevent communication of said second control pressure to said outlet port and simultaneously complete communication between said first control pressure and said outlet port, and additional resilient means effective for at times moving said valve member against said first valve seat to terminate said communication of said first control pressure and complete the communication of said second control pressure to said outlet port.

5. A pressure ratio device according to claim 1 including output signal responsive valving means for directing one of said first and second control pressures to opposite sides of said pressure responsive reset means when one of said first and second output signals is produced and for directing said first and second control pressures to opposite sides of said pressure responsive reset means when the other of said first and second output signals is produced.